US012623302B2

(12) United States Patent
Jeong

(10) Patent No.: US 12,623,302 B2
(45) Date of Patent: May 12, 2026

(54) MACHINE TOOL

(71) Applicant: DN SOLUTIONS CO., LTD.,
Changwon-si (KR)

(72) Inventor: Seonghoon Jeong, Gimhae-si (KR)

(73) Assignee: DN SOLUTIONS CO., LTD.,
Changwon-si (KR)

( * ) Notice: Subject to any disclaimer, the term of this
patent is extended or adjusted under 35
U.S.C. 154(b) by 809 days.

(21) Appl. No.: 17/921,608

(22) PCT Filed: Apr. 22, 2021

(86) PCT No.: PCT/KR2021/005107
§ 371 (c)(1),
(2) Date: Oct. 26, 2022

(87) PCT Pub. No.: WO2021/221387
PCT Pub. Date: Nov. 4, 2021

(65) Prior Publication Data
US 2023/0201965 A1 Jun. 29, 2023

(30) Foreign Application Priority Data
Apr. 29, 2020 (KR) ........................ 10-2020-0052944

(51) Int. Cl.
*B23K 26/342* (2014.01)
*B22F 12/00* (2021.01)
(Continued)

(52) U.S. Cl.
CPC .......... *B23K 26/342* (2015.10); *B22F 12/226*
(2021.01); *B22F 12/37* (2021.01);
(Continued)

(58) Field of Classification Search
CPC ...... B23K 26/342; B22F 12/226; B22F 12/37;
B22F 12/38; B22F 12/90; B22F 12/88;
(Continued)

(56) References Cited

U.S. PATENT DOCUMENTS

| | | | |
|---|---|---|---|
| 2018/0065181 A1* | 3/2018 | Mori | .................... B23K 26/144 |
| 2023/0201965 A1* | 6/2023 | Jeong | .................. B23K 26/342 |

FOREIGN PATENT DOCUMENTS

| | | |
|---|---|---|
| CN | 209239487 U | 8/2019 |
| EP | 3002080 B1 | 2/2018 |

(Continued)

OTHER PUBLICATIONS

Machine Translation of Lee (KR 2020037614) performed on Aug.
27, 2025 (Year: 2020).*

(Continued)

*Primary Examiner* — Brian W Jennison
(74) *Attorney, Agent, or Firm* — STIP Law Group, LLC

(57) ABSTRACT

The present disclosure relates to a machine tool including a
bed, a table tiltably installed on the bed and configured such
that a workpiece is seated on the table, a saddle movably
installed on the bed, a column movably installed on the
saddle, a spindle movably and tiltably installed on the
column and configured to clamp or unclamp a tool and
process a workpiece, and a stacking unit configured to
perform stacking processing on the workpiece, in which the
stacking unit is detachably mounted on the spindle while
substituting for a tool to be clamped to the spindle and
changing a mounting position of the stacking unit depending
on a stacking processing position of the workpiece.

8 Claims, 10 Drawing Sheets

*600 : 610,620,630
*800 : 810,820,830,840

(51) Int. Cl.
  B22F 12/37    (2021.01)
  B22F 12/90    (2021.01)
  B23Q 3/155    (2006.01)
  B33Y 30/00    (2015.01)
  B33Y 50/02    (2015.01)

(52) U.S. Cl.
  CPC ............ B22F 12/90 (2021.01); B23Q 3/1552
   (2013.01); B33Y 30/00 (2014.12); B33Y 50/02
                 (2014.12)

(58) Field of Classification Search
  CPC ...... B33Y 50/02; B33Y 33/00; B23Q 3/1552;
               B23Q 2230/002
  See application file for complete search history.

(56)        References Cited

FOREIGN PATENT DOCUMENTS

| | | |
|---|---|---|
| JP | H05237733 A | 9/1993 |
| KR | 20200037614 A | 4/2020 |

OTHER PUBLICATIONS

International serach report of PCT/KR2021/005107, Aug. 18, 2021, English translation.

\* cited by examiner

*600 : 610,620,630
*800 : 810,820,830,840

*700 : 710,720,730

*700 : 710,720,730
*820 : 821,822,823

*700 : 710,720,730

*700 : 710, 720, 730

*700 : 710,720,730
*820 : 821,822,823

*700 : 710,720,730

MACHINE TOOL

CROSS-REFERENCE TO RELATED APPLICATIONS

This application is the U.S. National Phase under 35 U.S.C. § 371 of International Application No. PCT/KR2021/005107 filed on Apr. 22, 2021, which in turn claims the benefit of Korean Application No. 10-2020-0052944, filed on Apr. 29, 2020, the disclosures of which are incorporated by reference into the present application.

FIELD OF THE DISCLOSURE

The present disclosure relates to a machine tool, and more particularly, to a machine tool in which a stacking unit is detachably mounted on a spindle while substituting for a tool to be clamped to the spindle and changing, by a storage unit, a mounting position of the stacking unit depending on a stacking processing position of a workpiece, thereby minimizing interference, expanding a stacking processing area, and maximizing productivity.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used to suit the purpose of the corresponding work in various industrial sites.

The multi-tasking machining center, among the machine tools, refers to a turning center equipped with a multifunctional automatic tool changer (ATC) and a tool magazine in order to perform various types of processing such as turning, drilling, tapping, or milling. In the case of the multi-tasking machining center, an operator manually mounts a tool on a tool magazine when loading the tool required for a machining process or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which transfers the workpiece to machine the workpiece, a palette used to prepare the workpiece to be machined, a spindle coupled to a tool or the workpiece and configured to be rotated, and a tailstock and a steady rest configured to support the workpiece during the machining process.

In general, the machine tool is provided with a transfer unit configured to transfer the table, a tool post, the spindle, the tailstock, and the steady rest along a transfer shaft in order to perform various types of machining operations.

Further, the machine tool uses a plurality of tools in order to perform various types of machining operations, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

Further, the machine tool is generally equipped with an automatic palette changer (APC) in order to minimize the non-machining time. The automatic palette changer (APC) automatically changes the palettes between a workpiece machining region and a workpiece loading region. The workpiece may be mounted on the palette.

In addition, the machine tool is equipped with the automatic tool changer (ATC) configured to withdraw a specific tool from the tool magazine or remount the tool on the tool magazine based on an instruction of a numerical control unit in order to improve productivity of the machine tool.

In general, a machining center refers to a machine tool that has the automatic tool changer and changes various types of tools to perform various types of machining that may be performed by lathes, milling machines, drilling machines, boring machines, and the like. The machining center is mainly classified into a horizontal machining center and a vertical machining center in which a spindle is vertically mounted.

The vertical machining center may include a bed, a saddle installed above the bed, a table installed on the saddle and configured to allow a workpiece to be placed on the table, a column vertically mounted behind the bed, a spindle mounted on the column, a power transmission system configured to operate the spindle, and an electronic control system configured to control the operation of the spindle. The vertical machining center may further include an automatic tool changer, and a headstock configured to clamp a tool magazine and a tool.

In addition, the machining center is generally subdivided into a column moving type machining center, a saddle moving type machining center, and a ram type machining center. In general, the column moving type machining center and the saddle moving type machining center each mainly have a structure in which two axes (an X-axis and a Y-axis) and one axis (a Z-axis) separately move, and the ram type machining center has a structure in which three axes (the X-axis, the Y-axis, and the Z-axis) simultaneously move. However, the present disclosure is not necessarily limited thereto.

In the case of the column moving type machining center in the related art, a saddle is coupled to an upper portion of a bed so as to be movable in an X-axis direction (a vertical direction), a column is coupled to an upper portion of the saddle so as to be movable in a Y-axis direction (a horizontal direction), and a spindle is coupled to the column so as to be movable in a Z-axis direction (a height direction). In addition, the saddle, the column, and the spindle are transferred by transfer units, respectively. The transfer unit includes a ball screw, a linear guide, a servo motor, and the like.

A metallic material may be easily formed in various shapes and have excellent electromagnetic characteristics and high strength, and thus the metallic material accounts for 60% or more of industrial basic materials.

Representative examples of traditional methods of forming the metal include plastic processing that forms the material in various shapes by applying external forces to the material. Examples of the plastic processing include forging, rolling, pressing, extrusion, and sheet metal processing. That is, traditional machine processing or metal processing is performed by cutting and trimming materials.

However, recently, a 3D printing technology has been developed as a new method of forming metal.

The 3D printing technology refers to a technology for outputting an object by using a printer and uses a method similar to a method of printing letters on paper by using a printer in the related art. The 3D printing technology outputs a three-dimensional product by using a three-dimensional modeling file as an output source, and a machine using the 3D printing technology is called a 3D printer.

At the initial time of developing the 3D printer, the 3D printer outputs three-dimensional product by mainly using curable materials such as plastic. Recently, the 3D printer can output three-dimensional products by using metal.

The 3D printing technology using metal mainly uses metal powder as a material. Depending on stacking methods, the representative methods include (a) a powder bed fusion (PB) method of stacking raw metallic materials by sintering or melting only desired portions of the raw metallic materials by irradiating the raw metallic materials in the form of powder with laser beams or electron beams, (b) a binder jetting (BJ) method of combining materials by spraying a bonding agent in the form of a liquid onto the materials in the form of powder, and (c) a directed energy deposition (DED) method of applying molten materials by using a nozzle mounted on a multi-axis arm.

As illustrated in FIGS. 1 and 2, a recent machine tool has a stacking device 6 coupled to a spindle 5 and configured to process a workpiece 7 by irradiating metal powder with laser beams and stacking the metal powder while adopting the 3D printing technology in order to perform high-precision processing on complicated shapes of components such as turbines or aircraft components.

However, as illustrated in FIGS. 1 and 2, the machine tool in the related art performs the stacking processing in a state in which the stacking device 6 is fixedly attached to a left or right side of the spindle 5.

That is, in case that the stacking device 6 is mounted at the left side of the spindle 5 as illustrated in FIG. 1, the machine tool in the related art causes no interference when performing the processing on a second stacking processing position B, which is a right side of the workpiece illustrated in FIG. 2, because the stacking device is accessible.

However, in case that the stacking device 6 is mounted at the left side of the spindle 5 as illustrated in FIG. 2, the stacking device of the machine tool in the related art cannot easily approach the workpiece while performing the processing on a first stacking processing position A, which is a left side of the workpiece illustrated in FIG. 2, because of interference with the workpiece or other devices, which causes a problem in that the stacking device cannot smoothly perform the stacking processing.

In addition, because the stacking device of the machine tool in the related art is always fixedly installed at a left side, a right side, or a center of a front side of the spindle, interference occurs in case of processing the workpiece with other tools, which causes a problem in that processing precision and productivity deteriorate.

Moreover, because the stacking device of the machine tool in the related art is always mounted on the spindle, even in a state in which the stacking device is not used, and thus the stacking device is exposed to the processing area, which causes a problem in that stacking device is contaminated by chips, cutting oil, or foreign substances, and maintenance costs are increased.

Therefore, there is an acute need to develop a machine tool capable of quickly attaching the stacking unit to the spindle in case of performing the stacking processing, quickly detaching the stacking unit from the spindle in case of performing general processing, and conveniently and easily changing a stacking position of the stacking unit mounted on the spindle depending on a stacking processing position of the workpiece to be subjected to the stacking processing.

DISCLOSURE

Summary

The present disclosure has been made in an effort to solve the above-mentioned problems, and an object of the present disclosure is to provide a machine tool, in which a stacking unit is detachably mounted on a spindle while substituting for a tool to be clamped to the spindle and changing, by a storage unit, a mounting position of the stacking unit mounted on the spindle depending on a stacking processing position of a workpiece, which makes it possible to minimize interference with other structures during stacking processing, improve utilization of the stacking processing, prevent interference even during general processing, and improve processing precision, in which the machine tool quickly processes a complicated shape, which makes it possible to reduce processing costs, reduce non-processing time, and maximize productivity, and in which the machine tool separates and stores the stacking unit during the general processing, which is not the stacking processing, which makes it possible to minimize contamination of the stacking unit caused by chips and foreign substances, reduce maintenance costs and time, and improve stability and reliability of the machine tool.

In order to achieve the above-mentioned object, the present disclosure provides a machine tool including: a bed; a table tiltably installed on the bed and configured such that a workpiece is seated on the table; a saddle movably installed on the bed; a column movably installed on the saddle; a spindle movably and tiltably installed on the column and configured to clamp or unclamp a tool and process a workpiece; and a stacking unit configured to perform stacking processing on the workpiece, in which the stacking unit is detachably mounted on the spindle while substituting for a tool to be clamped to the spindle and changing a mounting position of the stacking unit depending on a stacking processing position of the workpiece.

In addition, in another exemplary embodiment of the machine tool according to the present disclosure, the machine tool may further include a storage unit installed on the bed or the table and configured to store the stacking unit and change the mounting position of the stacking unit in case of mounting the stacking unit on the spindle.

In addition, in another exemplary embodiment of the machine tool according to the present disclosure, the machine tool may further include a transfer unit configured to transfer the saddle, the column, and the spindle.

In addition, in another exemplary embodiment of the machine tool according to the present disclosure, the machine tool may further include a control unit configured to control operations of the transfer unit, the stacking unit, and the storage unit to automatically change the mounting position of the stacking unit in case of mounting the stacking unit on the spindle in accordance with the stacking processing position of the workpiece and the order of the stacking processing.

In addition, in another exemplary embodiment of the machine tool according to the present disclosure, the stacking unit may include: an optic part configured to perform laser stacking processing on the workpiece; a support part having one side coupled to the optic part; and a mounting part installed at the other side of the support part and detachably coupled to a tool clamping part provided on the spindle.

In addition, in another exemplary embodiment of the machine tool according to the present disclosure, the storage unit may include: a base part provided on the bed or the table and extending in a height direction; a cam box part installed on the base part; a shaft part having one side rotatably installed on the cam box part; and a change part installed at the other side of the shaft part and configured to be rotatable in conjunction with the shaft part and hold the stacking unit.

In addition, in another exemplary embodiment of the machine tool according to the present disclosure, the cam box part may include: a housing part; a cam follower installed on the housing part and configured to restrict and guide a rotation angle of the change part; and a driving part installed on the housing part and generate power for rotating the cam follower.

In addition, in another exemplary embodiment of the machine tool according to the present disclosure, a process of clamping or unclamping the stacking unit held by the change part to or from the tool clamping part may be performed as the spindle moves forward or rearward toward or away from the change part after the spindle tilts to be parallel to the mounting part held by the change part.

In addition, in another exemplary embodiment of the machine tool according to the present disclosure, to perform the stacking processing on a first stacking processing position by the stacking unit, the change part holding the stacking unit may rotate to a first preparation position, the spindle may move to the change part after tilting, and the stacking unit may be clamped to the spindle so that the stacking unit is positioned at a first mounting position.

In addition, in another exemplary embodiment of the machine tool according to the present disclosure, to perform the stacking processing on a second stacking processing position by the stacking unit, the change part holding the stacking unit may rotate to a second preparation position, the spindle may move to the change part after tilting, and the stacking unit may be clamped to the spindle so that the stacking unit is positioned at a second mounting position.

According to the machine tool according to the present disclosure, the stacking unit is detachably mounted on the spindle while substituting for a tool to be clamped to the spindle and changing, by the storage unit, the mounting position of the stacking unit mounted on the spindle depending on the stacking processing position of the workpiece, which makes it possible to minimize interference with other structures during the stacking processing, improve utilization of the stacking processing, prevent interference even during the general processing, and improve processing precision.

In addition, according to the machine tool according to the present disclosure, the stacking unit is detachably mounted on the spindle while substituting for a tool to be clamped to the spindle and changing, by the storage unit, the mounting position of the stacking unit mounted on the spindle depending on the stacking processing position of the workpiece, which makes it possible to minimize interference with other structures during the stacking processing, prevent damage to the equipment caused by a collision by using stacking processing, and improve stability and reliability of the machine tool. The machine tool separates and stores the stacking unit during the general processing, which makes it possible to prevent contamination caused by chips and foreign substances and reduce maintenance costs and time.

Moreover, according to the machine tool according to the present disclosure, the mounting position of the stacking unit mounted on the spindle is quickly changed depending on the stacking processing position of the workpiece by transferring the storage unit and the spindle, which makes it possible to reduce the non-processing time, improve the productivity, and improve the operator's satisfaction.

Furthermore, according to the machine tool according to the present disclosure, the mounting position of the stacking unit mounted on the spindle is quickly changed depending on the stacking processing position of the workpiece by transferring the storage unit and the spindle, such that the stacking processing using the metal powder and the laser beams may be performed together with the general machine processing in a hybrid manner by the single machine tool, which makes it possible to improve the processing precision, quickly and easily process a complicated shape, and reduce the processing costs.

DETAILED DESCRIPTION OF CERTAIN INVENTIVE EMBODIMENT

Figure 1:
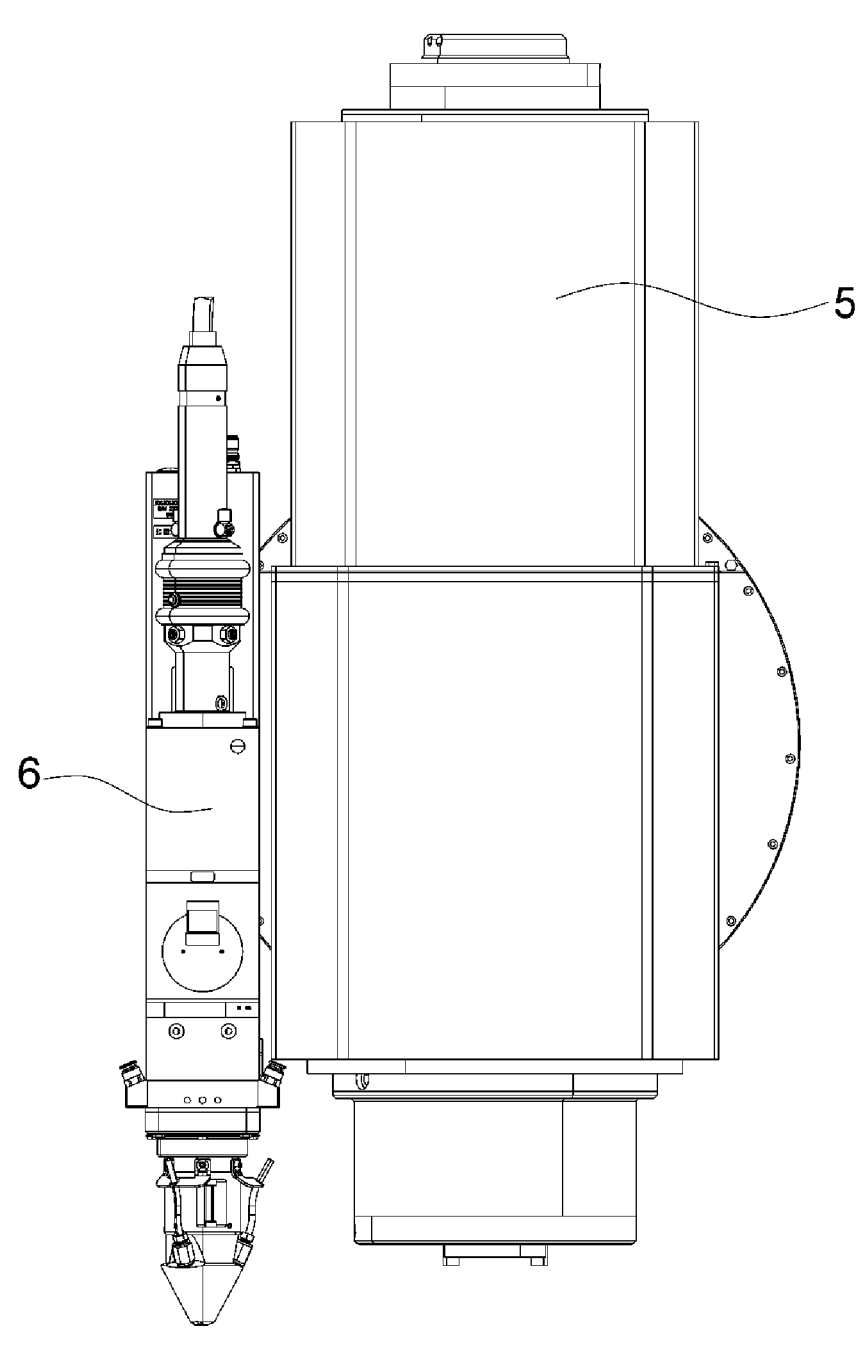
FIG. 1 is a conceptual view illustrating a state in which a stacking device is installed on a spindle of a machine tool in the related art.
Figure 2:
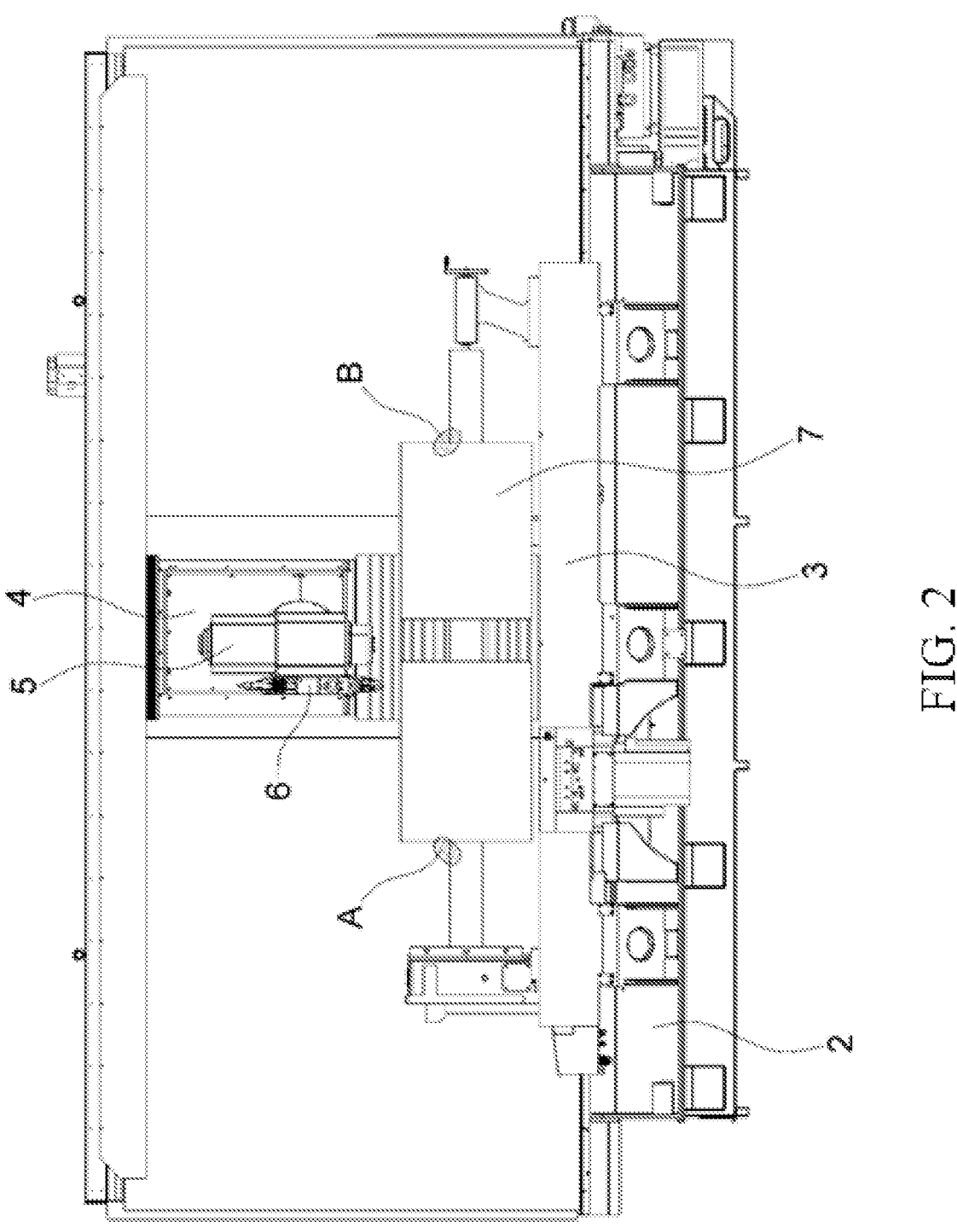
FIG. 2 is a conceptual view for explaining a problem of the occurrence of interference at a stacking processing position in a state in which the stacking device is installed on the spindle of the machine tool in the related art.

Hereinafter, a machine tool according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude presence or addition of one or more other constituent elements, steps, operations, and/or elements.

Figure 3:
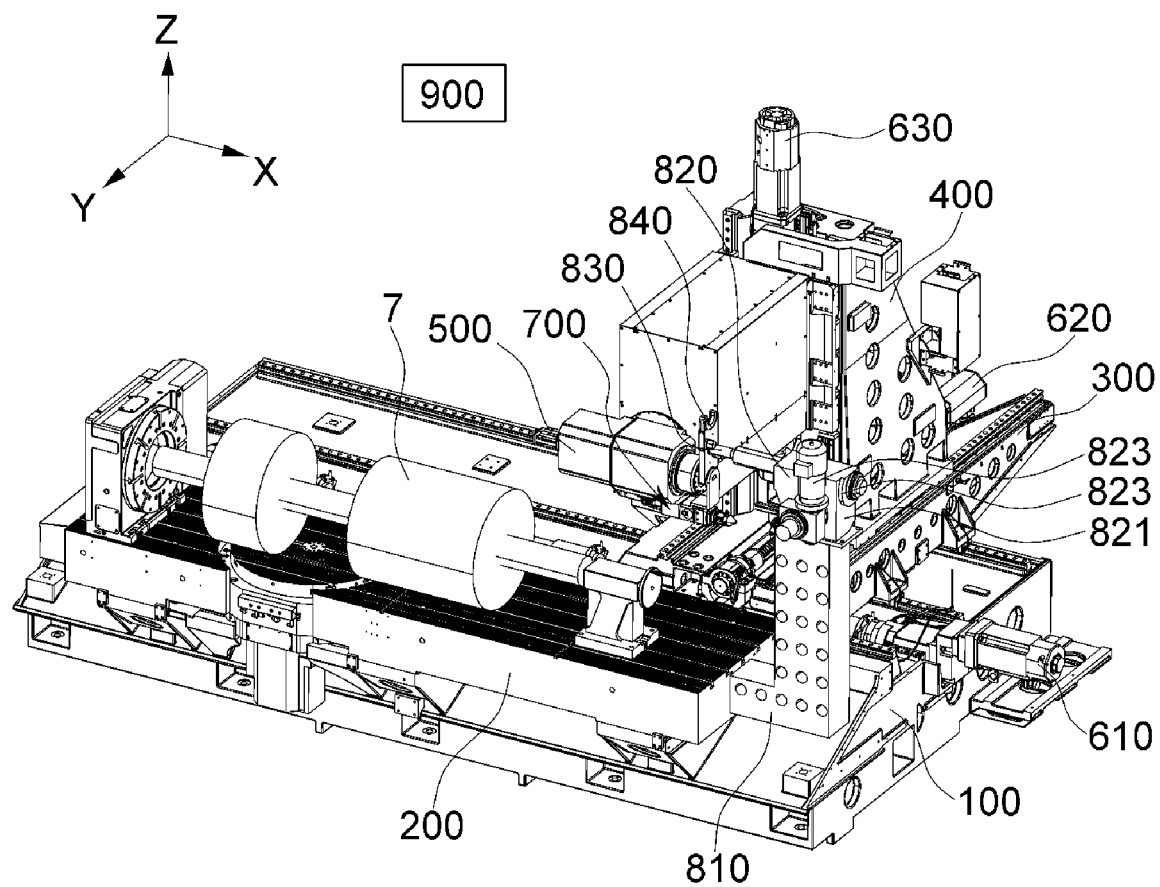
FIG. 3 is a perspective view of a machine tool according to the present disclosure.
Figure 4:
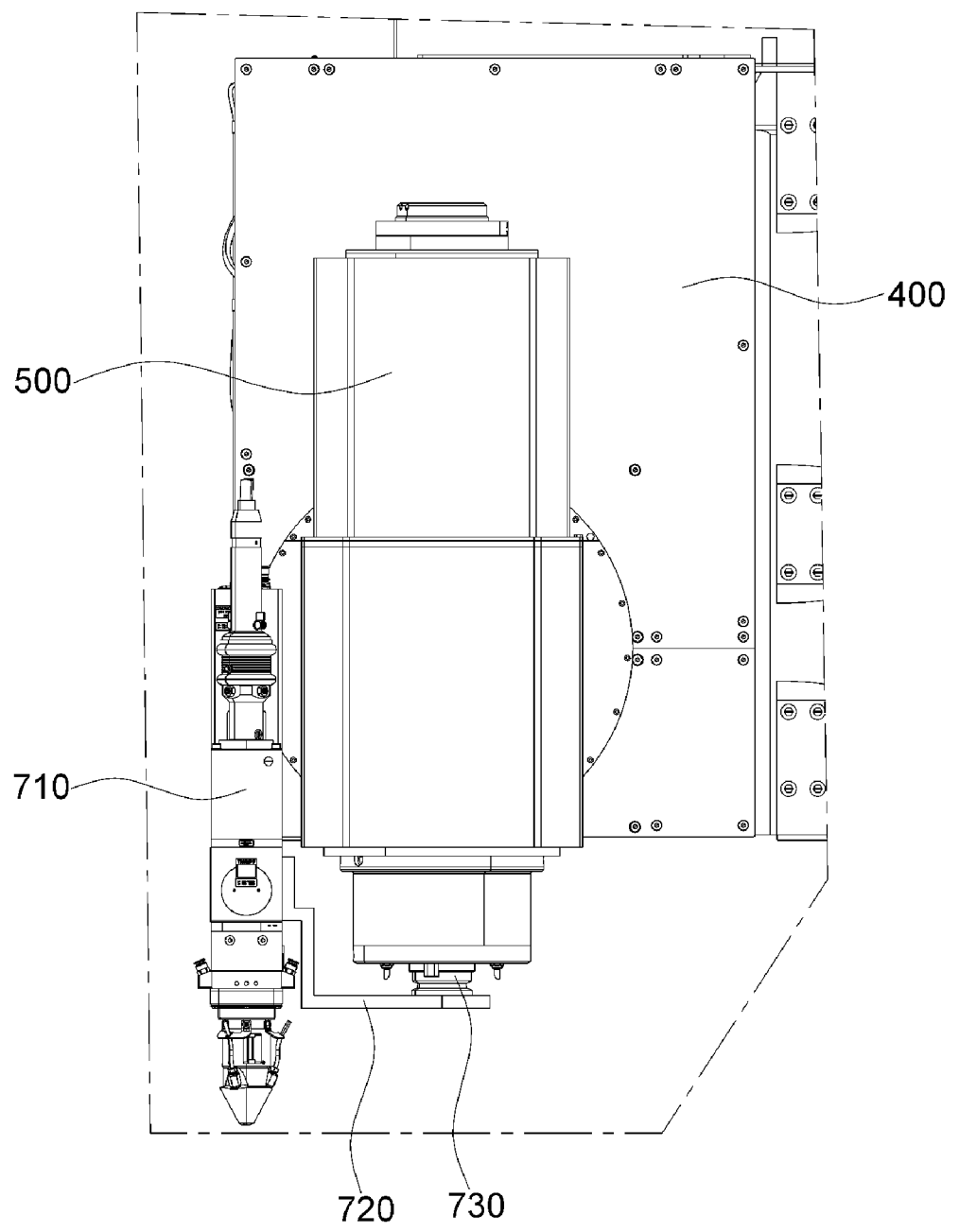
FIG. 4 is a perspective view illustrating a state in which a stacking unit is mounted on a spindle of the machine tool according to the present disclosure.
Figure 5:
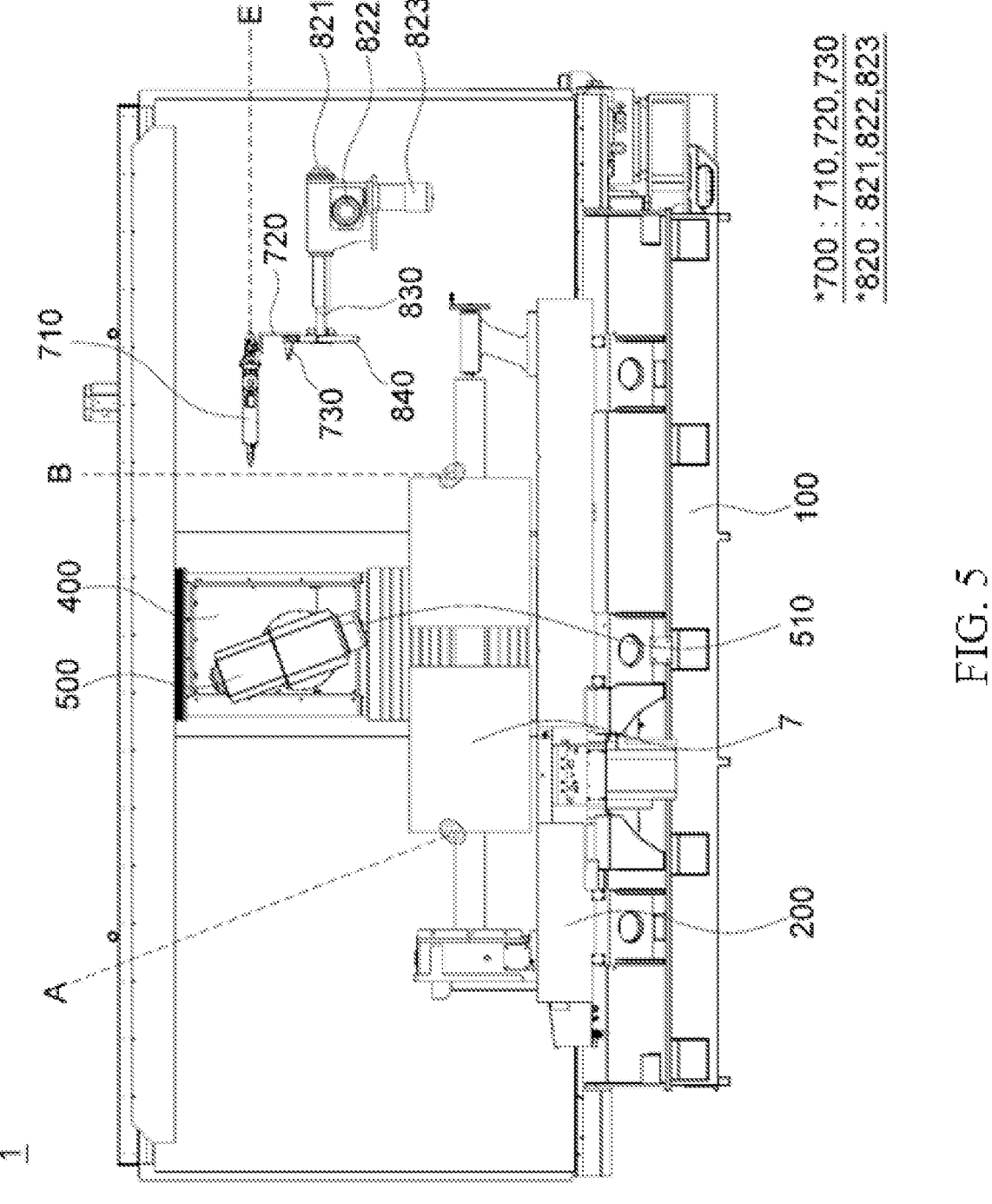
FIG. 5 is a conceptual view illustrating a state in which the spindle moves to a storage unit while tilting in a state in which the stacking unit is on standby at a first preparation position in the storage unit to process a first stacking processing position in the machine tool according to the present disclosure.
Figure 6:
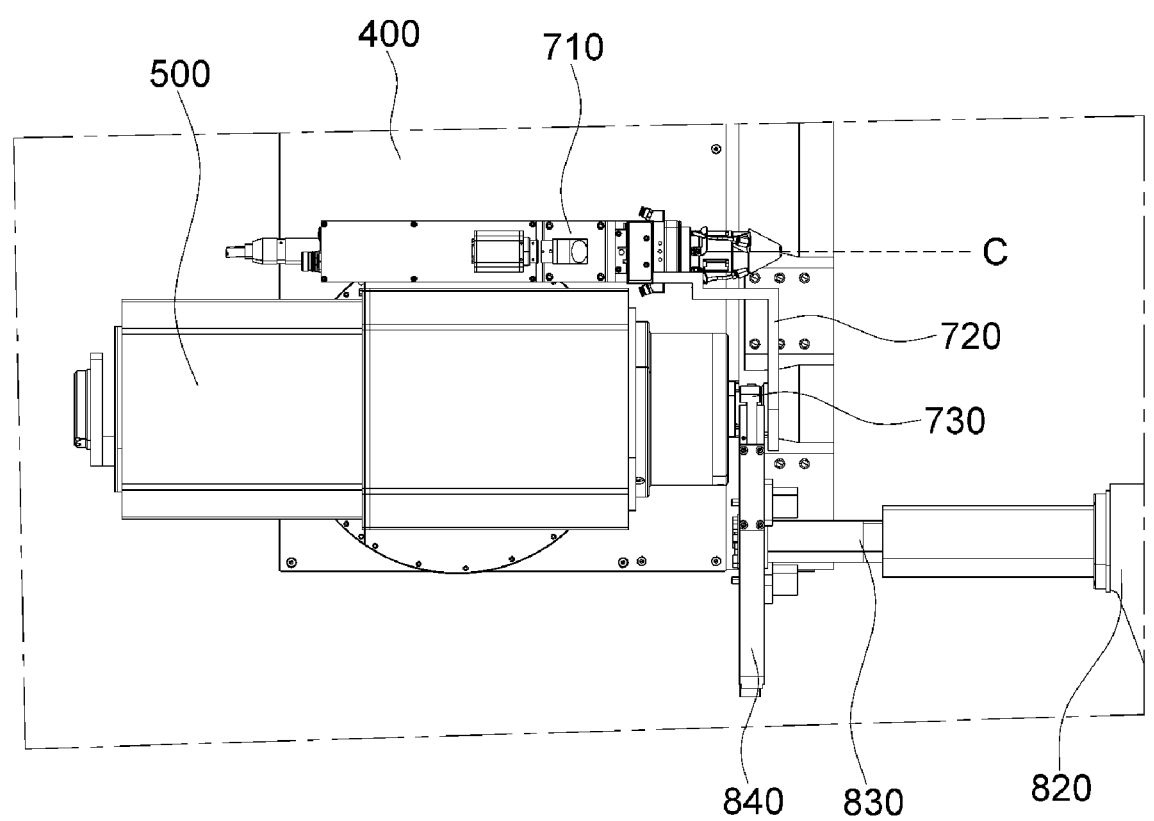
FIG. 6 is a conceptual view illustrating a state in which the stacking unit is mounted at a first mounting position on the spindle of the machine tool according to the present disclosure to process the first stacking processing position.
Figure 7:
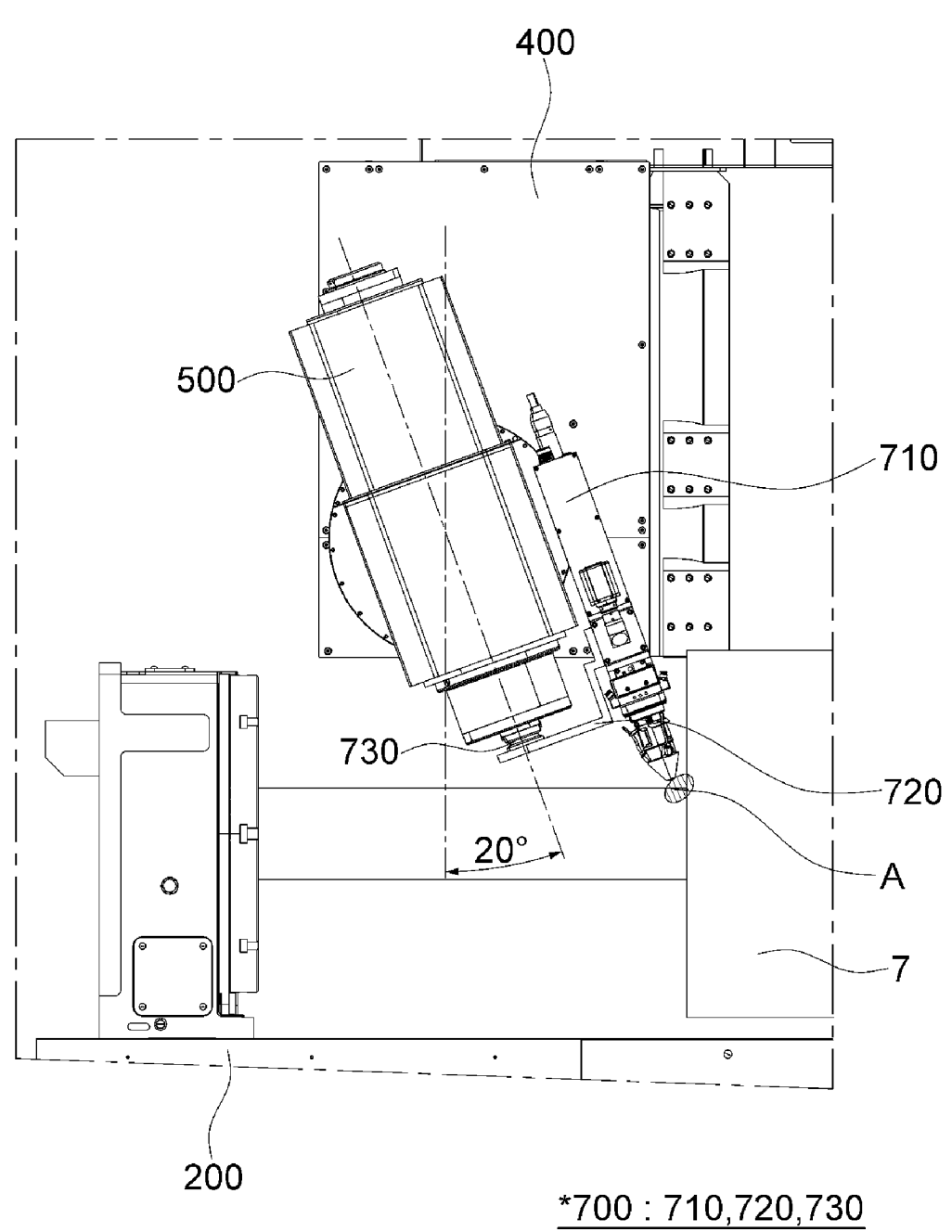
FIG. 7 is a conceptual view illustrating a state in which the stacking unit processes the first stacking processing position on a workpiece in a state in which the stacking unit is mounted at the first mounting position on the spindle of the machine tool according to the present disclosure.
Figure 8:
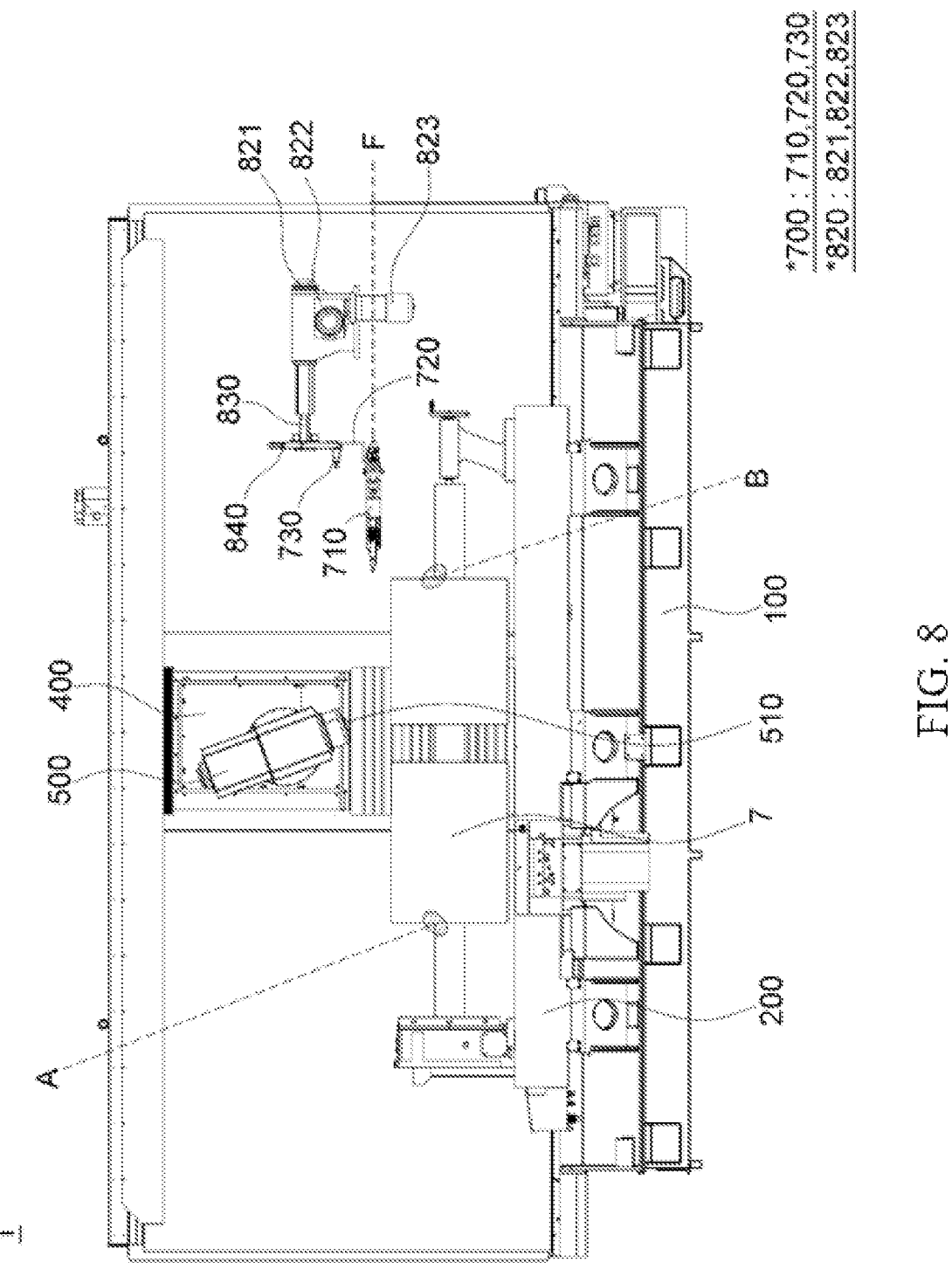
FIG. 8 is a conceptual view illustrating a state in which the spindle moves to the storage unit while tilting in a state in which the stacking unit is on standby at a second preparation position in the storage unit to process a second stacking processing position in the machine tool according to the present disclosure.
Figure 9:
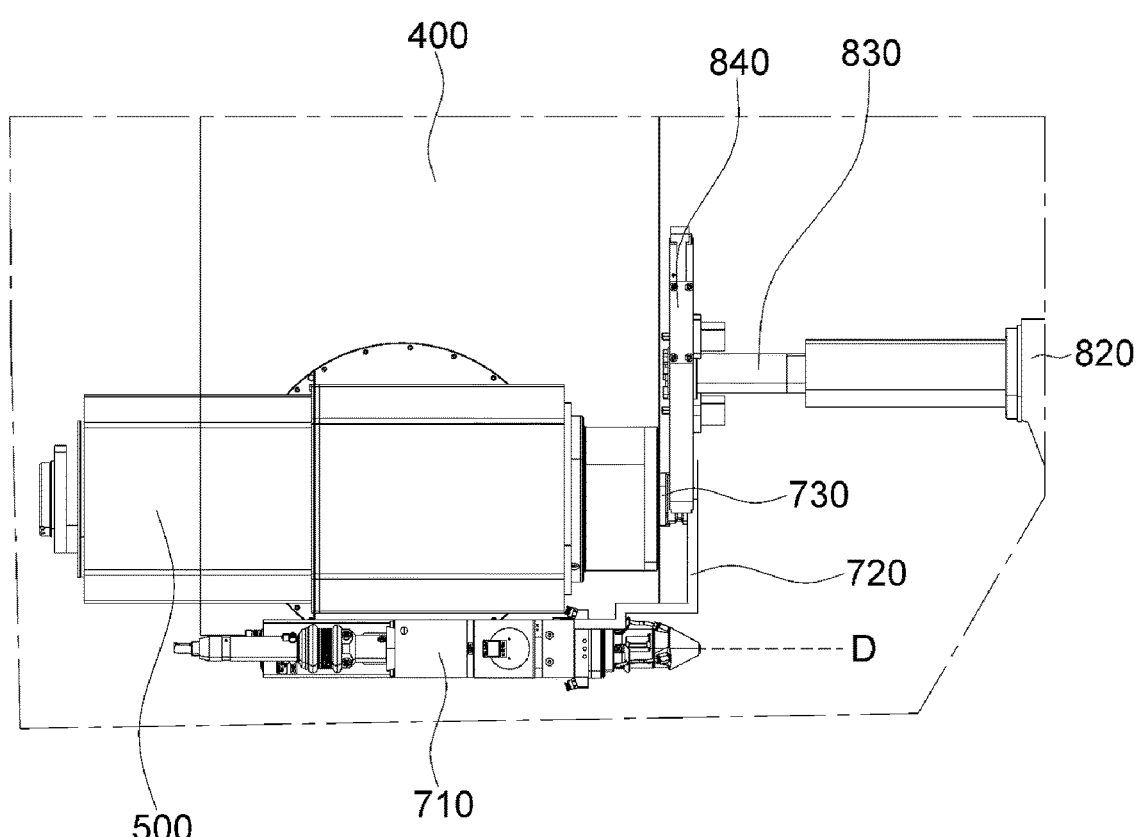
FIG. 9 is a conceptual view illustrating a state in which the stacking unit is mounted at the second mounting position on the spindle of the machine tool according to the present disclosure to process the second stacking processing position.
Figure 10:
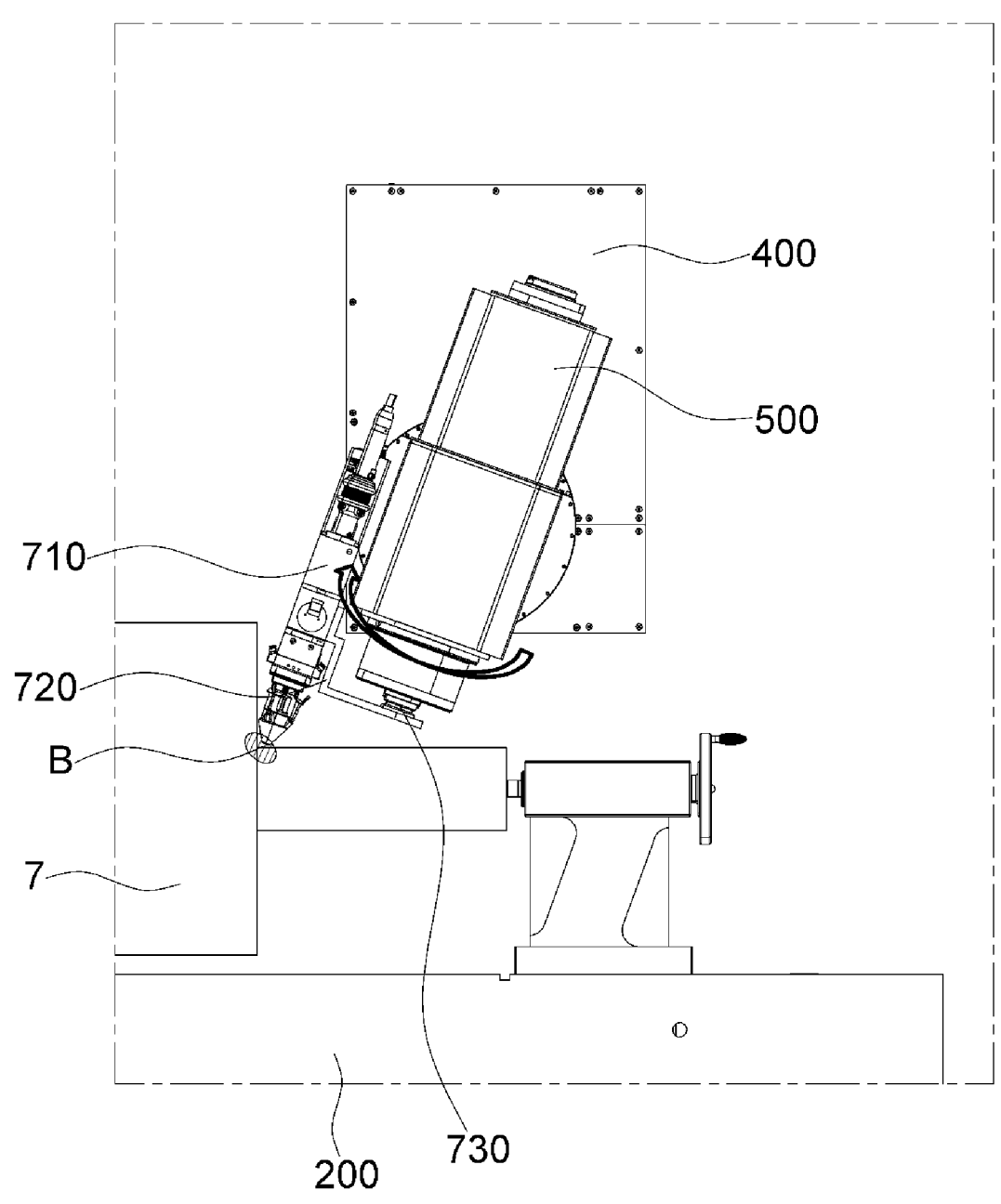
FIG. 10 is a conceptual view illustrating a state in which the stacking unit processes the second stacking processing position on the workpiece in a state in which the stacking unit is mounted at the second mounting position on the spindle of the machine tool according to the present disclosure.

FIG. 3 is a perspective view of a machine tool according to the present disclosure, and FIG. 4 is a perspective view illustrating a state in which a stacking unit is mounted on a spindle of the machine tool according to the present disclosure. FIG. 5 is a conceptual view illustrating a state in which the spindle moves to a storage unit while tilting in a state in which the stacking unit is on standby at a first preparation position in the storage unit to process a first stacking processing position in the machine tool according to the present disclosure, FIG. 6 is a conceptual view illustrating a state in which the stacking unit is mounted at a first mounting position on the spindle of the machine tool according to the present disclosure to process the first stacking processing position, and FIG. 7 is a conceptual view illustrating a state in which the stacking unit processes the first stacking processing position on a workpiece in a state in which the stacking unit is mounted at the first mounting position on the spindle of the machine tool according to the present disclosure. FIG. 8 is a conceptual view illustrating a state in which the spindle moves to the storage unit while tilting in a state in which the stacking unit is on standby at a second preparation position in the storage unit to process a second stacking processing position in the machine tool according to the present disclosure, FIG. 9 is a conceptual view illustrating a state in which the stacking unit is mounted at the second mounting position on the spindle of the machine tool according to the present disclosure to process the second stacking processing position, and FIG. 10 is a conceptual view illustrating a state in which the stacking unit processes the second stacking processing position on the workpiece in a state in which the stacking unit is mounted at the second mounting position on the spindle of the machine tool according to the present disclosure.

The terms used below are defined as follows. The term "horizontal direction" means a horizontal direction, i.e., an X-axis direction in FIG. 3 on the same member, the term "vertical direction" means a vertical direction, i.e., a Y-axis direction in FIG. 3 on the same member that is orthogonal to the horizontal direction, and the term "height direction" means an upward/downward direction, i.e., a Z-axis direction in FIG. 3 on the same member that is orthogonal to the horizontal direction and the vertical direction. In addition, the term "upward (upper)" means an upward direction in the height direction, i.e., a direction toward an upper side in the Z-axis direction in FIG. 3, and the term "downward (lower)" means a downward direction in the height direction, i.e., a direction toward a lower side in the Z-axis direction in FIG. 3. In addition, the term "forward (front)" means a leftward direction in the horizontal direction on the same member, i.e., a direction toward a left side in the drawings in a direction away from a storage unit in FIGS. 3 to 9, and the term "rearward (rear)" means a rightward direction in the horizontal direction on the same member, i.e., a direction toward a right side in the drawings in a direction toward the storage unit in FIGS. 3 to 9. In addition, the term "inward (inner)" means a side relatively close to a center of the same member, i.e., an inner side in FIGS. 3 to 9, and the term "outward (outer)" means a side relatively distant from the center of the same member, i.e., an outer side in FIGS. 3 to 9.

A machine tool 1 according to the present disclosure will be described with reference to FIGS. 3 to 10. As illustrated in FIGS. 3 to 10, the machine tool 1 according to the present disclosure includes a bed 100, a table 200, a saddle 300, a column 400, a spindle 500, a transfer unit 600, a stacking unit 700, a storage unit 800, and/or a control unit 900.

The bed 100 is installed on a ground surface or a base. The bed 100 serves as a support for supporting a workpiece to be machined and provides a space in which components required to machine the workpiece are installed.

The table 200 is installed on an upper portion of the bed 100, and the workpiece is seated on the table 200. The table 200 is provided as a rotary table, but the present disclosure is not necessarily limited thereto. However, as necessary, the table may be provided as a stationary table fixed to the bed. That is, FIG. 1 illustrates that the table 200 is tiltably rotated relative to the bed 100, but the present invention is not necessarily limited thereto. The table 200 may move in the vertical direction, the horizontal direction, and the height direction on the upper portion of the bed 100 or be fixed to the bed 100, as necessary.

The saddle 300 is movably installed on an upper portion of the bed 100. The saddle 300 is installed on the upper portion of the bed 100 so as to be adjacent to the table 200. In addition, as illustrated in FIG. 3, the saddle 300 may be rectilinearly reciprocated in the horizontal direction (X-axis direction) on the upper portion of the bed 100 by the transfer unit 60, specifically, a saddle transfer part 610 installed on the bed 100. In addition, the saddle 300 is disposed on the upper portion of the bed 100 and serves to support the column 400.

The column 400 is movably installed on an upper portion of the saddle 300. The column 400 is installed above the saddle 300 in the height direction (Z-axis direction), but the present disclosure is not necessarily limited thereto. That is, as illustrated in FIG. 3, the column 400 may move forward or rearward in the vertical direction (Y-axis direction) on the upper portion of the saddle 300 by the transfer unit 600, i.e., a column transfer part 620 installed on the upper portion of the saddle 300.

The spindle 500 is movably and tiltably installed on the column 400. To process a workpiece, a tool clamped by a tool clamping part installed on the spindle rotates to process the workpiece seated on the table. That is, as illustrated in FIG. 3, the spindle 500 may rectilinearly reciprocate in the height direction (Z-axis direction) along one side of the column 400 by the transfer unit 600, i.e., a spindle transfer part 630 installed on the column 400. Specifically, the spindle 500 may be configured as a spindle head on which a Z-axis slide and a main shaft are mounted to be movable in the height direction along the column 400.

The transfer unit 600 serves to move the saddle 300, the column 400, and the spindle 500. As illustrated in FIG. 3, the transfer unit 600 separately includes the saddle transfer part 610 configured to transfer the saddle, the column transfer part 620 configured to transfer the column, and the spindle transfer part 630 configured to transfer the spindle.

In addition, specifically, the saddle transfer part, the column transfer part, and the spindle transfer part may each include a ball screw, a linear guide provided in the form of an LM guide rail, a linear guide block, and a servo motor, but the present disclosure is not necessarily limited thereto. The servo motor is controlled in response to a control signal of the control unit to be described below.

The stacking unit 700 is detachably installed on the spindle to perform stacking processing on the workpiece 7. That is, the stacking unit 700 is detachably mounted on the spindle while substituting for a tool to be clamped to the spindle and changing a mounting position of the stacking unit mounted on the spindle depending on a stacking processing position of the workpiece seated on the table, and the stacking unit 700 performs the stacking processing.

The storage unit 800 is coupled and installed onto the bed or table to store the stacking unit 700 and change the mounting position of the stacking unit in case of mounting the stacking unit on the spindle. That is, when the stacking unit does not perform the stacking processing on the workpiece, the storage unit 800 stores the stacking unit, which makes it possible to prevent interference with other devices during general processing and improve the processing precision. Because the stacking unit is stored and separated from the processing area, it is possible to prevent contamination caused by chips or foreign substances and reduce maintenance costs and time. In addition, when it is necessary to perform the stacking processing on the workpiece, the storage unit 800 rotates the workpiece, which is held by a change part to be described below, to change the mounting position of the workpiece mounted on the spindle depending on the stacking processing position of the workpiece. Therefore, it is possible to quickly and conveniently detach or attach the stacking unit to a position at which the occurrence of interference with the spindle is minimized and a position at which the stacking processing is easily performed.

The control unit 900 controls operations of the transfer unit, the stacking unit, and the storage unit to automatically change the mounting position of the stacking unit in case of mounting the stacking unit on the spindle in accordance with the stacking processing position of the workpiece 7 and the order of the stacking processing.

In addition, the control unit includes numerical control (NC) or computerized numerical control (CNC) and is embedded with various types of numerical control programs. That is, drive programs for the saddle transfer part, the column transfer part, the spindle transfer part, a driving unit to be described below, and the stacking unit are embedded in the control unit, and the corresponding program is automatically loaded and executed by an operation of the control unit. In addition, the control unit communicates with the spindle, the transfer unit, the stacking unit, and the storage unit through a predetermined protocol.

In addition, although not illustrated in the drawings, according to the exemplary embodiment of the present disclosure, the control unit includes a main operation part. The main operation part includes a screen display program and a data input program in accordance with a selection of a screen display and performs a function of displaying a software switch on a display screen in accordance with an output of the screen display program and a function of recognizing an ON/OFF state of the software switch and making an instruction about an input and an output for an operation of the machine.

In addition, the main operation part has a monitor installed in or at one side of a housing or a casing of the machine tool and capable of displaying multifunctional switches or buttons and various types of information, but the present disclosure is not necessarily limited thereto.

The PLC (programmable logic controller) communicates with the control unit, the transfer unit, and the driving unit through the predetermined protocol and serves to make a control instruction through this communication. That is, the PLC operates the transfer unit, the driving unit, the stacking unit, and a magazine based on a numerical control program of the control unit.

Although not illustrated in the drawings, according to the present disclosure, the control unit 900 of the machine tool may further include a display part and/or a selection part.

The display part may display, in real time, operating states and operation results of the stacking unit, the storage unit, the transfer unit, and the magazine, thereby improving a user's convenience. The display part may include at least one of a liquid crystal display (LCD), a thin-film transistor liquid crystal display (TFT LCD), an organic light-emitting diode display (OLED display), a flexible display, a 3D display, and an e-ink display.

In addition, the display part includes a screen display program and a data input program in accordance with a selection of a screen display and performs a function of displaying a software switch on a display screen in accordance with an output of the screen display program and a function of recognizing an ON/OFF state of the software switch and making an instruction about an input and an output for an operation of the machine.

In addition, the display part may be installed in or at one side of a housing or a casing of the machine tool and display multifunctional switches or buttons and various types of information, but the present disclosure is not necessarily limited thereto.

Therefore, according to the machine tool according to the present disclosure, the stacking unit is detachably mounted on the spindle while substituting for a tool to be clamped to the spindle and changing, by the storage unit, the mounting position of the stacking unit mounted on the spindle depending on the stacking processing position of the workpiece, which makes it possible to minimize interference with other structures during the stacking processing, improve utilization of the stacking processing, prevent interference even during the general processing, improve processing precision, and improve stability and reliability of the machine tool. The stacking unit is separately stored during the general processing, which makes it possible to prevent contamination caused by chip or foreign substances, reduce maintenance costs and time. The mounting position of the stacking unit mounted on the spindle is quickly changed depending on the stacking processing position of the workpiece by transferring the storage unit and the spindle, which makes it possible to reduce non-processing time and improve productivity. The stacking processing is performed together with the general machine processing in a hybrid manner by the single machine tool, which makes it possible to improve processing precision, quickly and easily process a complicated shape, reduce processing costs, and improve an operator's satisfaction.

As illustrated in FIGS. 3 to 10, the stacking unit 700 of the machine tool 1 according to the present disclosure includes an optic part 710, a support part 720, and a mounting part 730.

The optic part 710 serves to perform laser stacking processing on the workpiece 7. The stacking processing is performed by a powder bed fusion (PB) method that stacks raw metallic materials by sintering or melting only desired portions by irradiating the raw metallic materials in the form of powder with laser beams from the optic part, but the present disclosure is not necessarily limited thereto. Specifically, the optic part is installed at a desired angle and a desired position, such as a right side of the spindle, a left side of the spindle, or a front side of the spindle, by the support part and the mounting part, which will be described below, in accordance with the stacking processing position of the workpiece seated on the table. Therefore, interference with the workpiece or other devices is prevented when the stacking processing is performed on the workpiece by using the optic part, which makes it possible to maximize stacking processing utilization. The optic part is conveniently detached after the stacking processing, which makes it possible to improve processing precision.

One side of the support part 720 is coupled to the optic part. That is, the support part 720 is provided in the form of a metal plate. One side of the support part 720 is coupled to the optic part by bolting, riveting, welding, or the like, and the mounting part is provided at the other side of the support part 720.

The mounting part 730 is installed at the other side of the support part 720 and detachably coupled to a tool clamping part 510 provided on the spindle. That is, the mounting part 730 is disposed at the other side of the support part and provided in the form of a tapered shank to correspond to the tool clamping part installed on the spindle to clamp or unclamp the tool.

As described above, the stacking unit that has a simple structure is quickly, securely, and detachably mounted on the spindle instead of a tool to be clamped to or unclamped from the tool clamping part, which makes it possible to reduce the non-processing time, improve productivity, reduce the size, make the machine tool compact, maximize the spatial utilization, minimize the interference, and reduce the manufacturing and installation costs.

As illustrated in FIGS. 3 to 10, the storage unit 800 of the machine tool 1 according to the present disclosure includes a base part 810, a cam box part 820, a shaft part 830, and a change part 840.

The base part 810 is provided on the bed 100 or the table 200 and extends in the height direction (Z-axis direction). That is, the base part 810 is provided in the form of a cylindrical or quadrangular frame provided on the bed or table and extending in the height direction and provides a space in which the cam box part, the shaft part, and the change part are installed. The base part 810 supports the cam box part, the shaft part, and the change part.

The cam box part 820 is installed on the base part 810. As illustrated in FIG. 3, the cam box part 820 includes a housing part 821, a cam follower 822, and a driving part 823.

The housing part 821 defines an overall external shape of the cam box part. The housing part is installed at one side of the base part. That is, the housing part 821 is installed at one side of the base part and provides the space in which the cam follower and the driving part, which constitute the cam box part, are installed.

The cam follower 822 is installed in the housing part 821 and restricts and guides a rotation angle of the change part 840. That is, the cam follower 822 is provided in the form of a circular disc plate and installed in the housing part 821. The cam follower 822 may be rotated at a predetermined rotation angle by driving power of the driving part 640. Therefore, when the driving part is operated under the control of the control unit, the cam follower rotates by a predetermined rotation angle, and the shaft part connected to and installed on the cam follower rotates clockwise or counterclockwise by the rotation angle of the cam follower. Therefore, finally, the change part rotates clockwise or counterclockwise in the rotation direction of the driving part by the clockwise or counterclockwise rotation angle of the cam follower. In the present disclosure, the rotation angle of the cam follower is illustrated as being set to 180 degrees, but the present disclosure is not limited thereto. As necessary, the rotation angle of the cam follower may be set to various angles such as 180 degrees, 120 degrees, 90 degrees, 60 degrees, and 45 degrees.

The driving part 823 is installed in the housing part 821 and generates power for rotating the cam follower. That is, the cam follower is rotated by rotational driving power of the driving part, and the shaft part connected to the cam follower is rotated. In addition, the change part is rotated in conjunction with the shaft part. The driving part 823 is configured as a servo motor and operated in response to a control signal of the control unit.

One side of the shaft part 830 is rotatably installed on the cam box part 820. That is, one side of the shaft part 830 is installed to be rotatable in conjunction with the cam follower of the cam box part, and the other side of the shaft part 830 is coupled to and installed on the change part.

The change part 840 is installed at the other side of the shaft part 830 and configured to be rotatable in conjunction with the shaft part and hold the stacking unit. That is, the change part 840 rotates in conjunction with the rotation of the shaft part. Although not illustrated in the drawings, fingers capable of gripping the mounting part are provided at two opposite ends of the change part and grip the mounting part, thereby gripping the stacking unit detached from the spindle. In contrast, to clamp the stacking unit to the spindle, the spindle moves toward the mounting part gripped by the fingers of the change part, the mounting part is inserted and coupled into the tool clamping part, and pressing forces of the fingers are simultaneously eliminated. Therefore, a mounting operation is easily performed.

Specifically, a process of clamping or unclamping the stacking unit held by the change part to or from the tool clamping part is performed as the spindle moves forward or rearward toward or away from the change part after the spindle tilts to be parallel to the mounting part held by the change part.

An operational principle in which the stacking unit stored in the storage unit is detachably mounted on the spindle of the machine tool according to the present disclosure while changing the mounting position depending on the stacking processing position of the workpiece will be described with reference to FIGS. 5 to 10.

As illustrated in FIGS. 5 to 7, to perform the stacking processing on the first stacking processing position A by the stacking unit, the change part holding the stacking unit rotates to the first preparation position E, the spindle moves to the change part after tilting, and the stacking unit is clamped to the spindle so that the stacking unit is positioned at the first mounting position C.

Specifically, to process the first stacking processing position A, which is the left portion of the workpiece illustrated in the drawings, by using the stacking unit, the stacking unit needs to be mounted at the first mounting position C, which is the right side of the spindle, to minimize interference. To this end, the change part holding the stacking unit rotates so that the change part is positioned at the first preparation position E at which the change part is positioned at the upper side. In this case, to mount the stacking unit on the spindle, the spindle tilts clockwise or counterclockwise to be parallel, in the horizontal direction, to the mounting part held by the change part. At the same time, the spindle moves rearward to the right side based on the drawings so that the spindle is directed toward the change part, and the mounting part is clamped to the tool clamping part. Thereafter, in the state in which the stacking unit is mounted at the first mounting position on the spindle, the spindle moves forward to the left side based on the drawings away from the change part and tilts so that the processing is performed at a desired angle, and then the stacking processing is performed. A process of returning the stacking unit from the first mounting position to the storage unit is performed in the reverse order to the above-mentioned process.

Likewise, as illustrated in FIGS. 8 to 10, to perform the stacking processing on a second stacking processing position B by the stacking unit, the change part holding the stacking unit rotates to the second preparation position E, the spindle moves to the change part after tilting, and the stacking unit is clamped to the spindle so that the stacking unit is positioned at a second mounting position D.

Specifically, to process the second stacking processing position B, which is the right portion of the workpiece illustrated in the drawings, by using the stacking unit, the stacking unit needs to be mounted at the second mounting position D, which is the left side of the spindle, to minimize interference. To this end, the change part holding the stacking unit rotates so that the change part is positioned at the second preparation position F at which the change part is positioned at the lower side. In this case, to mount the stacking unit on the spindle, the spindle tilts clockwise or counterclockwise to be parallel, in the horizontal direction, to the mounting part held by the change part. At the same time, the spindle moves rearward to the right side based on the drawings so that the spindle is directed toward the change part, and the mounting part is clamped to the tool clamping part. Thereafter, in the state in which the stacking unit is mounted at the second mounting position on the spindle, the spindle moves forward to the left side based on the drawings away from the change part and tilts so that the processing is performed at a desired angle, and then the stacking processing is performed. A process of returning the stacking unit from the second mounting position to the storage unit is performed in the reverse order to the above-mentioned process.

Therefore, according to the machine tool according to the present disclosure, the stacking unit is detachably mounted on the spindle while substituting for a tool to be clamped to the spindle and changing, by the storage unit, the mounting position of the stacking unit mounted on the spindle depending on the stacking processing position of the workpiece, which makes it possible to minimize interference with other structures during the stacking processing, improve utilization of the stacking processing, prevent interference even during the general processing, and improve processing precision. The machine tool quickly processes a complicated shape, which makes it possible to reduce the processing costs, reduce the non-processing time, and maximize the productivity. The machine tool separates and stores the stacking unit during the general processing, which is not the stacking processing, which makes it possible to minimize the contamination of the stacking unit caused by chips and foreign substances, reduce maintenance costs and time, and improve stability and reliability of the machine tool.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

DESCRIPTION OF MAIN REFERENCE NUMERALS OF DRAWINGS

1: Machine tool
100: Bed
200: Table
300: Saddle
400: Column
500: Spindle
600: Transfer unit
700: Stacking unit
710: Optic part
720: Support part
730: Mounting part
800: Storage unit
810: Base part
820: Cam box part
830: Shaft part
840: Change part
900: Control unit

The invention claimed is:
1. A machine tool comprising:
a bed;
a table tiltably installed on the bed and configured such that a workpiece is seated on the table;
a saddle movably installed on the bed;
a column movably installed on the saddle;
a spindle movably and tiltably installed on the column and configured to clamp or unclamp a tool and process a workpiece;
a stacking unit configured to perform stacking processing on the workpiece; and
a storage unit configured to store the stacking unit and change the mounting position of the stacking unit in case of mounting the stacking unit on the spindle,
wherein the stacking unit is detachably mounted on the spindle while substituting for a tool to be clamped to the spindle and changing a mounting position of the stacking unit depending on a stacking processing position of the workpiece,
wherein the stacking unit comprises:
an optic part configured to perform laser stacking processing on the workpiece;

a support part having one side coupled to the optic part; and a mounting part installed at the other side of the support part and detachably coupled to a tool clamping part provided on the spindle.

2. The machine tool of claim 1, comprising:

a transfer unit configured to transfer the saddle, the column, and the spindle.

3. The machine tool of claim 2, comprising:

a control unit configured to control operations of the transfer unit, the stacking unit, and the storage unit to automatically change the mounting position of the stacking unit in case of mounting the stacking unit on the spindle in accordance with the stacking processing position of the workpiece and the order of the stacking processing.

4. The machine tool of claim 1, wherein the storage unit comprises:

a base part provided on the bed or the table and extending in a height direction;

a cam box part installed on the base part;

a shaft part having one side rotatably installed on the cam box part; and a change part installed at the other side of the shaft part and configured to be rotatable in conjunction with the shaft part and hold the stacking unit.

5. The machine tool of claim 4, wherein the cam box part comprises:

a housing part;

a cam follower installed on the housing part and configured to restrict and guide a rotation angle of the change part; and a driving part installed on the housing part and generate power for rotating the cam follower.

6. The machine tool of claim 5, wherein a process of clamping or unclamping the stacking unit held by the change part to or from the tool clamping part is performed as the spindle moves forward or rearward toward or away from the change part after the spindle tilts to be parallel to the mounting part held by the change part.

7. The machine tool of claim 6, wherein to perform the stacking processing on a first stacking processing position by the stacking unit, the change part holding the stacking unit rotates to a first preparation position, the spindle moves to the change part after tilting, and the stacking unit is clamped to the spindle so that the stacking unit is positioned at a first mounting position.

8. The machine tool of claim 6, wherein to perform the stacking processing on a second stacking processing position by the stacking unit, the change part holding the stacking unit rotates to a second preparation position, the spindle moves to the change part after tilting, and the stacking unit is clamped to the spindle so that the stacking unit is positioned at a second mounting position.

* * * * *